United States Patent [19]
Ahmed et al.

[11] Patent Number: 6,160,804
[45] Date of Patent: Dec. 12, 2000

[54] MOBILITY MANAGEMENT FOR A MULTIMEDIA MOBILE NETWORK

[75] Inventors: Walid Ahmed, Eatontown; Bharat Tarachand Doshi, Holmdel, both of N.J.; Subrahmanyam Dravida, Groton, Mass.; Hong Jiang, Westfield; Kiran M. Rege, Marlboro, both of N.J.

[73] Assignee: Lucent Technologies Inc., Murray Hill, N.J.

[21] Appl. No.: 09/191,134

[22] Filed: Nov. 13, 1998

[51] Int. Cl.[7] .............................. H04J 3/24; H04L 12/28; H04L 12/56

[52] U.S. Cl. .......................... 370/349; 370/400; 455/433

[58] Field of Search .................................... 370/349, 389, 370/392, 393, 400, 401; 455/433, 440, 422, 432, 517, 99, 100, 54.1, 54.2, 445; 395/410, 412, 415, 421.1, 421.11

[56] References Cited

U.S. PATENT DOCUMENTS

| | | | |
|---|---|---|---|
| 5,425,026 | 6/1995 | Mori .......................................... | 370/60 |
| 5,583,996 | 12/1996 | Tsuchiya ............................ | 395/200.15 |
| 5,732,086 | 3/1998 | Liang et al. ............................ | 370/410 |
| 5,781,453 | 7/1998 | Perlman et al. ......................... | 370/248 |
| 5,805,078 | 9/1998 | Sugiyama et al. .................. | 340/825.52 |
| 5,889,770 | 7/1998 | Jokiaho et al. .......................... | 370/337 |

OTHER PUBLICATIONS

Akyildiz, I.F., et al., "Mobility Management in Current and Future Communications Networks," IEEE Network, pp. 39–49, Jul./Aug. 1998.

Budka, K. et al., "Cellular Digital Packet Data Networks," Bell Labs Technical Journal, vol. 2, No. 3, Summer 1997.

"Cellular Digital Packet Data Systems Specification: Release 1.1," CDPD Forum, Inc., Chicago, 1995.

Corson, S., et al., "Mobile Ad Hoc Networking (MANET): Routing Protocol Performance Issues and Evaluation Considerations," draft–ietf–manet–issues–01.txt, Mar., 1998.

Wan, G., et al., "A Dynamic Paging Scheme for Wireless Communications Systems," ACM/IEEE MOBICOM '97, pp. 195–203, 1997.

"ISDN Based C Interface Access for PCS CDMA," Special Report SR–3797, Issue 1, Bellcore, Dec. 1995.

Perkins, C.E., et al., "Routing Optimization in Mobile IP," draft–ieft–mobileip–optim–07.txt, Nov. 20th, 1997.

Perkins, C.E., "Mobile IP," IEEE Communications Magazine, pp. May 1997.

Solomn, J.D., "Mobile IP: the Internet Unplugged," Prentice Hall, 1998.

Tabbane, S., "Evaluation of an Alternative Location Strategy for Future High Density Wireless Communications Systems," Wireless Information Network Laboratory, Jan. 1993.

Taylor, M.S., et al., "Internetwork Mobility The CDPD Approach," Prentice Hall PTR, Upper Saddle River, New Jersey 1996.

*Primary Examiner*—Alpus H. Hsu
*Assistant Examiner*—Duc Ho
*Attorney, Agent, or Firm*—Ryan, Mason & Lewis, LLP

[57] ABSTRACT

Various methodologies and related apparatus associated with mobility management issues within a packet-based multiaccess mobile communications system, which includes a plurality of mobile user stations and a plurality of network nodes, are provided. Location management techniques include tracking and/or locating mobile stations within the system. The invention makes use of home and visiting location registers in which information such as mobile station addresses and/or host names associated with mobile stations are stored. Mobile access methodologies include a complete mobile access method and a direct mobile access method. The former allows a mobile station to preferably include a unique address in the packets being transmitted, while the latter allows the station to merely use the host name of the destination station. The invention also includes various in-call mobility management techniques, including handoffs, which make use of the concept of an anchor.

19 Claims, 11 Drawing Sheets

MOBILITY MANAGEMENT FOR A MULTIMEDIA MOBILE NETWORK

CROSS REFERENCE TO RELATED APPLICATIONS

The present application is related to U.S. patent applications entitled "Subnetwork Layer For A Multimedia Mobile Network" and "Addressing Scheme For A Multimedia Mobile Network," both filed concurrently herewith.

The U.S. Government has a paid-up license in this invention and the right in limited circumstances to require the patent owner to license others on reasonable terms as provided for by the terms of contract no. DAAB07-98-C-D009 awarded by the U.S. Army.

FIELD OF THE INVENTION

The present invention relates to mobile communications systems and, more particularly, to mobility management techniques in such systems that may include multimedia applications in a highly dynamic networking environment.

BACKGROUND OF THE INVENTION

Several important mobility management issues need to be addressed in designing a communications system wherein the system is characterized by a dynamic network topology (e.g., mobile system access points or network nodes) and a relatively large number of mobile end users. Particularly, critical among them are issues such as: keeping track of mobile end users and access point locations in the system (i.e., location management); reaching and initiating communications with a mobile end user (i.e., mobile access); and continuity of service when a mobile end user moves between coverage areas associated with system access points (i.e., handoff management). Existing networks do provide solutions to these problems in their specific domains. As prior art, we discuss the solutions provided by Cellular Digital Packet Data (CDPD) networks, Cellular/Personal Communications Services (Cellular/PCS) systems, and Mobile Internet Protocol (mobile IP) networks.

CDPD networks consist of Mobile Data Intermediate Systems (MDISs), Mobile Data Base Stations (MDBSs), Mobile End Stations (MESs). An MDBS offering CDPD services helps a roaming MES register with the MDIS (called the serving MDIS) with which the MDBS is associated by acting as a conduit for the registration message. The serving MDIS informs the home MDIS of the MES of the latter's presence in its coverage area. When a host needs to send data to an MES, it does not have to be aware of the mobility aspect of the MES, it simply transmits data using the MES's IP address as the destination address. The IP packets are terminated at the home MDIS which encapsulates them in new data packets using the serving MDIS address as the destination address. The encapsulated data packets for the MES are forwarded to the serving MDIS of the MES. At the serving MDIS, packets are de-capsulated to reveal the MES's address. The serving MDIS sends the original data packets to the right channel where the MES is currently located. The MES receives the data packets. If the MES needs to reply, it directly sends data packets using the remote host's IP address as the destination address.

Intra-MDIS (i.e., between the two MDBSs served by the same MDIS) handoffs in CDPD are quick and simple because the data link between the MDIS and the mobile remains intact. However, Inter-MDIS handoffs could interrupt service since the data link will most likely be torn down when a mobile moves between MDISs. In this case, users have to reregister with the new serving MDIS. CDPD systems are further described in K. Budka et al., "Cellular Digital Packet Data Networks," Bell Labs Technical Journal, Vol. 2, No. 3 (Summer 1997); "Cellular Digital Packet Data Systems Specification: Release 1.1," CDPD Forum, Inc., Chicago (1995); and M. S. Taylor et al., "Internetwork Mobility: The CDPD Approach," Prentice Hall PTR, Upper Saddle River, N.J. (1996).

In Cellular/PCS systems, Home Location Registers (HLRs) and Visitor Location Registers (VLRs) are used to handle mobility management. HLRs and VLRs potentially can reside anywhere in the network. An HLR contains profile information about each of its mobile subscribers and the address of the current VLRs of its mobiles. Each Mobile Switching Center (MSC) has a VLR which tracks all mobiles currently receiving service in the serving MSC's coverage area. Whenever a mobile enters an area served by a new VLR and registers itself there, the latter informs the mobile's HLR of the change in the mobile's location. In addition, the VLR downloads the service profile of the roaming mobile as well as other information necessary for call termination at the mobile.

When a mobile terminated call is initiated, the first PSTN switch encountered by the calling party realizes that the called party number is a cellular/PCS number, thus it queries its HLR for the mobile's location. The HLR in turn contacts the current serving system and obtains a temporary local directory number (TLDN) from the current VLR. Using the TLDN, the first switch sets up the circuit to the serving MSC.

Typically, there are two types of handoffs in cellular/PCS networks: hard and soft handoffs. During a hard handoff, a mobile prepares a new, better quality link but switches to it only after it drops the air link between itself and its communicating node. During a soft handoff, a mobile can simultaneously have several air links (some of these can be dropped later when they are no longer needed). This phase can last as long as necessary to maintain good quality for the call. Soft handoffs are widely used by CDMA while hard handoffs are widely used by North American TDMA and GSM (also a TDMA system), as well as by AMPS (an FDMA system). Cellular/PCS systems are further described in "ISDN Based C Interface Access for PCS CDMA," Special Report SR-3797, Issue 1, Bellcore (December 1995).

While CDPD and Cellular/PCS networks were driven by the need to support wireless end users that may move when they are in a dormant mode as well as in an active (i.e., communicating) mode, mobile IP has a different motivation. It was driven by the need to support end users that would access the network from different points at different times. A mobile IP network consists of mobile nodes, home agents and foreign agents. A home agent is a router that authenticates a mobile node, tracks a mobile's location, and redirects data packets to the mobile's current location. A home agent maintains a table of all the mobile nodes that are homed to it with fields such as mobile's home address and mobile's care-of-address. A foreign agent assists the mobile node in informing its home agent of its current location, routes data traffic sent by the mobile, and sometimes provides the care-of-address and data packet de-capsulation for the mobile node. A foreign agent also maintains a list of visiting mobile nodes and their information.

Similar to CDPD, mobile IP also uses triangle routing. A mobile's home agent receives packets destined to the home address of the mobile and tunnels them to the care-of-address of the mobile node by encapsulating the original IP packets in new IP packets with the destination address set to the mobile's care-of-address. At the care-of address, the original packets are extracted from the tunnel and then delivered to the mobile node. In the reverse direction, packets are sent by the mobile directly to the remote host without tunneling.

Mobile IP with route optimization and smooth handoff is still in the Internet Engineering Task Force (IETF) draft stage, see C. E. Perkins et al., "Route Optimization in Mobile IP," draft-ietf-mobileip-optim-07.txt (Nov. 20, 1997). A mobile in handoff asks its new foreign agent to send a binding update to its previous foreign agent. During handoff, the previous foreign agent tunnels the transient packets to the new care-of-address. In case the previous foreign agent has no fresh binding, it can forward the transient packets to the home agent through a special tunnel which prevents routing loops from forming between the home agent and the previous foreign agent. Mobile IP is further described in C. E. Perkins, "Mobile IP," IEEE Communications Magazine, pp. 84–99 (May 1997); and J. D. Solomon, "Mobile IP: The Internet Unplugged," Prentice Hall (1998). Mobility issues are further described in "I. F. Akyildiz et al., "Mobility Management in Current and Future Communications Networks," IEEE Network, pp. 39–49 (July/August 1998). Also, mobile IP point-to-point communication is described in U.S. Ser. No. 09/150,403, filed on Sep. 9, 1998, and U.S. Ser. No. 09/074,582, filed on May 8, 1998, both entitled "A Mobile Point-to-Point Protocol," the disclosures of which are incorporated herein by reference.

However, there are several drawbacks to the individual approaches described above. For instance, as is known, mobile IP networks are typically hampered by route inefficiency problems. On the other hand, as is also known, cellular/PCS networks require significant signaling overhead during call setups and handoffs. As such, there is a need for a network architecture and mobility management techniques that yield an efficient, scaleable, and flexible communications system capable of handling various applications including multimedia applications.

SUMMARY OF THE INVENTION

The present invention provides a network architecture, an addressing scheme, and various mobility management methodologies, as well as apparatus for implementing them in a packet-based mobile communications system, which are capable of supporting various voice and data services including, for example, multimedia services.

In a first aspect of the invention, a new protocol layer is provided as part of a protocol stack associated with a packet-based multiaccess mobile communications system. The protocol layer is preferably located above a medium access control (MAC) protocol layer and a physical protocol layer of the system and below a transport/network protocol layer. Such a subnetwork protocol layer provides, inter alia, the communications system with various mobility management functions, for example, tracking mobile user stations throughout the system, mobile station access to the system, and connection/call continuity within the system. The subnetwork protocol layer of the invention also performs packet routing and forwarding functions associated with the system. Routing can be accomplished in many ways, for example, via source routing, connectionless routing, or tunneling. Further, it is to be appreciated that the new protocol layer of the invention is preferably located above a data link layer with respect to the protocol stack associated with communications between network nodes.

In a second aspect of the invention, an addressing scheme for a packet-based multiaccess mobile communications system, which includes a plurality of mobile user stations and a plurality of network nodes, is provided. In such addressing scheme, each mobile station is assigned an address which is a combination (preferably, a concatenation) of a unique identifier of a network node with which the mobile station is currently associated and an identifier of the mobile station. The network node identifiers may be uniquely assigned by a network administrator, while the identifiers of the mobile stations may, for example, be set to a universal MAC address assigned to the station. The address may also include a port identifier which indicates the particular application flow associated with the accompanying packets. Similarly, each network node is assigned an address which is a combination (preferably, a concatenation) of its network node identifier and, preferably, an interface identifier. Since a network node may have links with more than one other network node, the interface identifier uniquely identifies the link with which the packets are associated. The address may also include a port identifier which indicates the particular application flow associated with the accompanying packets. This unique addressing scheme is preferably implemented with respect to the subnetwork protocol layer.

Advantageously, the addressing scheme of the invention alleviates mobile user stations from needing to be concerned with the mobility of other mobile user stations within the system. That is, while the overall address of a mobile station may change due to the fact that it may become associated with a different network node, or a mobile station may have more than one address if it is associated with more than one network node, a correspondent mobile station (e.g., a mobile station with which a first station or initiating station is communicating with or wishes to communicate with) is still able to send and receive packets to and from the initiating mobile station since the identifier of a mobile station (e.g., universal MAC address) remains the same.

In a third aspect of the invention, various methodologies and related apparatus associated with mobility management issues within the system are provided, e.g., location management, mobile access, and in-call mobility management.

Location management techniques according to the invention, for example, include tracking and/or locating mobile stations within the system. The invention makes use of home and visiting location registers in which information such as mobile station addresses, preferably as described above, and/or host names associated with mobile stations are stored. Network nodes may query other network nodes to locate mobile stations based on such databases. Also, mobile stations themselves update such registers to inform them of their current locations. Subsequently, the updated network nodes update other network nodes of such location changes. Network nodes also preferably include a database containing the address for the home location register of each mobile station in the system.

Mobile access methodologies are also provided according to the invention. In one embodiment for use in a mobile station, a complete mobile access method includes searching a database for an address of a second mobile user station, the address being a combination of an identifier of the second mobile user station and an identifier of a network node with which the second mobile user station is currently associated. The first mobile station then transmits a packet containing the address of a second mobile user station and an address of the mobile user station itself, its address being a combination of an identifier of the mobile user station and an identifier of a network node with which the mobile user station is currently associated.

In another embodiment of mobile access according to the invention, a direct mobile access method includes inserting a host name associated with a second mobile user station in a packet, and transmitting the packet to a network node with which the station is in direct communication such that the network node (direct network node) can insert an address of the second station in place of the host name and then transfer the packet on to the second station. The initiating mobile station then preferably receives the address of the second station from the direct network node and replaces the host name with the address in a subsequent packet transmitted to the direct network node. The mobile station may alternatively receive the address of the second station from a home location register of the second station or the second station itself.

The invention also includes various in-call mobility management techniques which make use of the concept of an anchor. An anchor is a network node that is assigned to a mobile user station and acts as a permanent node (i.e., until deleted or changed) to which packets may be intermediately sent. The anchor then passes the packets on to the mobile station, regardless of where the mobile station has moved to in the system. Thus, preferably employing the unique addressing scheme discussed above, packets are directed to an anchor (via, for example, source routing or tunneling) which then directs the packets to the mobile station. If a mobile station moves a sufficient distance from its anchor, the system makes a decision to change the anchor of the mobile station to be a closer network node such as to optimize packet routing. It is to be appreciated that the use of anchors and the addressing scheme of the invention advantageously allow mobile stations to not be concerned with the mobility of another mobile with which it has established an existing connection or call. That is, correspondent mobile stations send packets to anchors which then forward them to the mobile station associated therewith, thus, effectively hiding one mobile station's location change from another correspondent mobile station.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be illustrated below in conjunction with an exemplary packet-based wireless communications system in which not only are end user terminals mobile, but in which system access points, referred to hereinafter as network nodes, are also mobile. It should be understood, however, that the invention is not limited to use with this particular system, but is instead more generally applicable to any multiaccess communications system with or without mobile network nodes. Further, the term "processor" as used herein is intended to include any processing device, including a CPU (central processing unit), which may be utilized in a mobile station or network node. Also, the term "memory" as used herein is intended to include memory associated with a processor or CPU, such as RAM, ROM, a fixed memory device (e.g., hard drive), or a removable memory device (e.g., diskette). In addition, the processing unit may include one or more input devices, e.g., keypad or keyboard, for inputting data to the processing unit, as well as one or more output devices, e.g., CRT display, for providing results associated with the processing unit. Accordingly, software instructions or code for performing the methodologies of the invention, described herein, may be stored in one or more of the associated memory devices (e.g., ROM, fixed or removable memory) and, when ready to be utilized, loaded into RAM and executed by the CPU.

Figure 1:
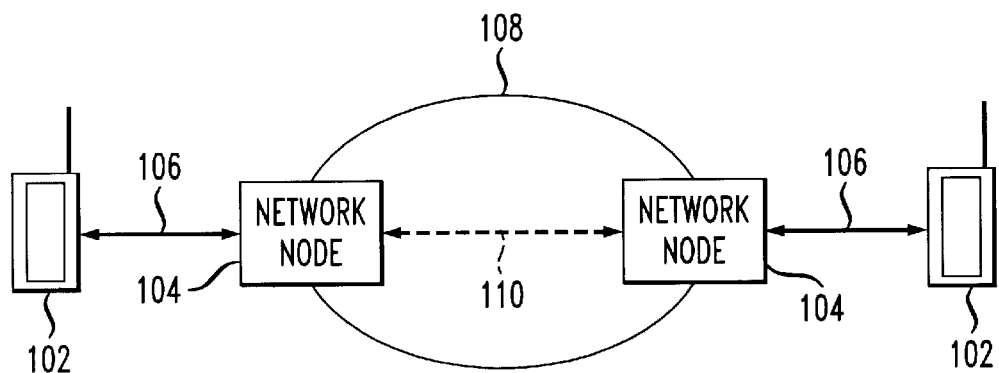
FIG. 1 is a block diagram of a mobile communications system according to an embodiment of the present invention.

Referring initially to FIG. 1, a block diagram of a mobile communications system 100 according to the present invention is shown. Particularly, mobile end users 102, hereinafter referred to as "mobile stations" (MSs), "mobile terminals," or, more simply, "mobiles", are operatively coupled to network nodes 104 via links 106. Like the mobiles 102, the network nodes 104 preferably have the ability to move. The network nodes 104 are operatively coupled to each other via an internode or backbone network 108. While FIG. 1 illustrates two mobiles and two network nodes, it is to be appreciated that the system 100 can accommodate many mobile end systems 102 (e.g., about one quarter of a million) and many network nodes 104 (e.g., about one thousand).

The internode network 108 includes a plurality of network nodes 104 preferably interconnected with point-to-point wireless links 110. It is to be appreciated that each network node 104 serves as both a base station to the mobiles 102 directly communicating therewith and as an intermediate router for packets passing therethrough. That is, each network node provides wireless access to the mobile terminals and also acts as a switch. Some of network nodes are preferably connected via satellite or terrestrial links to external networks, e.g., fixed networks (not shown). These nodes have the additional functionality of a "gateway" which provides the interworking functions to maintain consistency with the protocols used in these external networks. Also, it is through the internode network 108 that the system connects with various service providers (not shown) capable of providing various multimedia-based services to the mobiles 102. Further, some of the network nodes may be airborne. Mobiles may move from the coverage area associated with one network node to the coverage area of another network node. Because the network nodes, like the mobile stations, are mobile, the system 100 is characterized by a constantly changing topology.

As mentioned, network nodes are inter-connected with point-to-point wireless links. Also, these nodes are preferably equipped with a topology sensing scheme which enables them to sense the presence of other nodes as they move closer. The nodes use certain rules to select which of their neighboring nodes they should have links with. The idea is to enable nodes to establish links with their nearest neighbors (e.g., in terms of path loss) subject to certain connectivity requirements.

The system 100 provides connectionless switching between its end-points. That is, even for connection-oriented services (e.g., any TCP/IP applications, voice call applications, video sessions, etc.), there are no virtual circuits between the network nodes providing access to the mobile terminals involved in that call. The use of connectionless switching within the system 100 is preferred for at least the following reason: given the highly dynamic nature of the network topology, inter-node links are set up and torn down rather frequently and, as such, in the case of virtual circuit switching, this would necessitate the reestablishment/redirecting of a large number of virtual circuits (over new paths). However, with connectionless switching, changes in topology result only in changes in routing tables which can be handled much more efficiently than redirecting virtual circuits.

Figure 2:
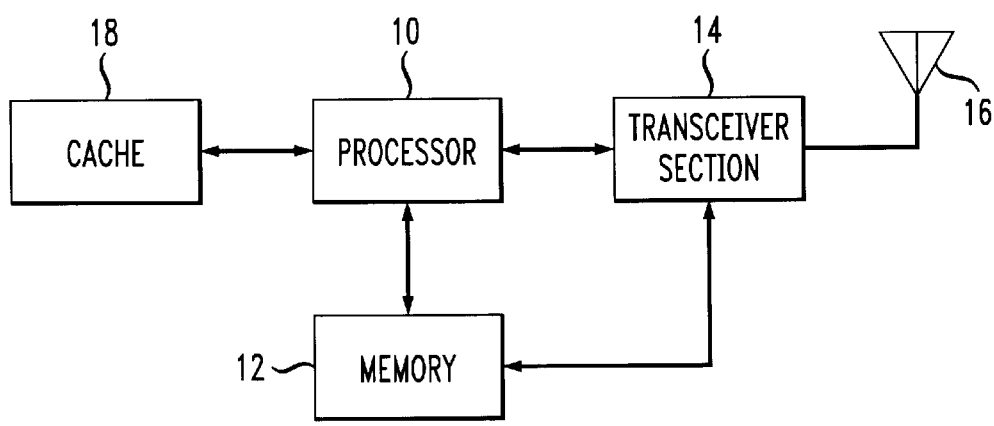
FIG. 2 is a block diagram of a hardware implementation of a mobile station and a network node according to an embodiment of the present invention.

Referring to FIG. 2, a block diagram of an exemplary hardware configuration of a mobile station 102 and a network node 104 is shown. Specifically, a processor 10 for controlling the operations, described herein, of either the mobile station or the network node is operatively coupled to a memory 12, a transceiver section 14, and a cache 18. An antenna 16 is operatively coupled to the transceiver 14. The processor 10 executes the methodologies associated with the mobility management schemes described herein in cooperation with memory 12. As will be explained, a separate cache 18 is preferably provided for handling certain finctions associated with the invention. The transceiver 14 and antenna 16, as is known, provide wireless connection to other elements of the system, e.g., between a mobile station 102 and a network node 104. The transceiver 14 contains a modem, which is configured to transmit and receive signals in a manner compatible with the air links employed. It is to be appreciated that the transceiver section 14 in a mobile may include more than one transmitter and receiver such that the mobile may communicate with more than one network node at a time over different frequency bands.

Network Architecture

Figure 3A:
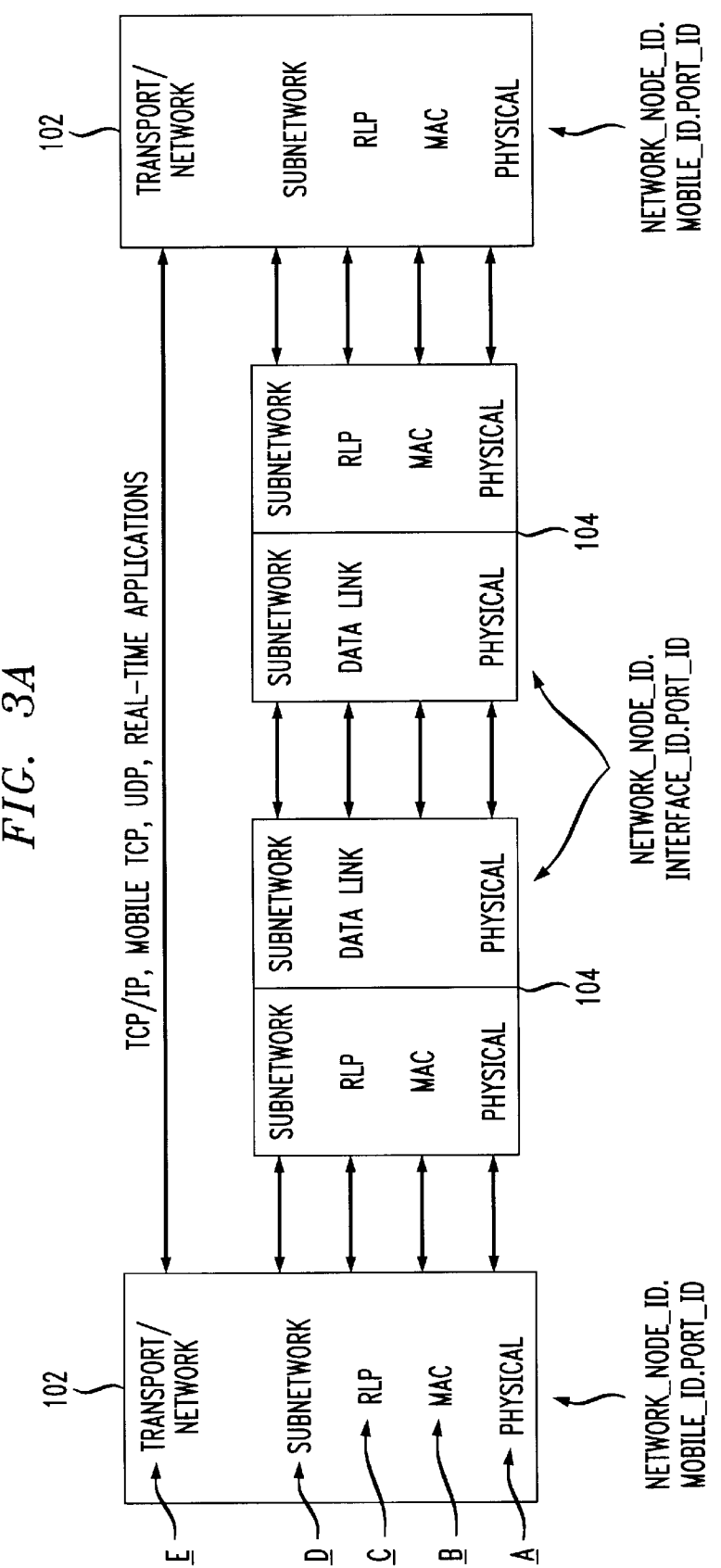
FIG. 3A is a block diagram of a network architecture of a mobile communications system according to an embodiment of the present invention.

Referring now to FIG. 3A, a layer-oriented network architecture according to the present invention is shown. It is to be understood that network nodes 104 provide network access to mobile stations 102 via a multiple access protocol. The multiple access protocol preferably provides shared, contention-based channels as well as reserved channels. The contention-based channels are used for control and signaling messages as well as for sporadic connectionless data. The reserved channels are used for those connections that require larger or guaranteed bandwidths or have strict delay requirements. Recall that within the internode network we have connectionless switching. Thus, in the case of connection-oriented applications, the connections can be identified in the access segments where there are resources dedicated on a per connection basis.

There are two distinct connection segments in the system 100 (FIG. 1). The first segment is the wireless access segment, i.e., links 106, which connects mobiles 102 with network nodes 104 and the second segment is the internode network 108 consisting of network nodes connected together with relatively high quality point-to-point links, i.e., links 110. The wireless access segment is preferably a shared multiple access medium in the reverse (uplink) direction and a broadcast medium in the forward (downlink) direction. "Uplink" refers to a signal path from a mobile station to a network node, while "downlink" refers to a signal path from a network node to a mobile station. For this segment, a medium access control (MAC) layer protocol (denoted as reference designation B in FIG. 3A) is employed on top of a Physical layer (denoted as reference designation A in FIG. 3A) to allow meaningful statistical sharing of bandwidth among the large number of mobile terminals 102 that could potentially be attempting to access the system 100 through a network node 104. The broadcast nature of the downlink which is being listened to by all of these terminals can be exploited to provide instructions/feedback to the terminals to improve the efficiency of the MAC layer protocol. The MAC layer protocol achieves these objectives in an efficient manner. The wireless access segment is preferably a TDMA/FDM (time division multiple access/frequency division multiplexing) scheme in that different nodes likely to interfere with each other minimize interference by using different frequency bands (FDM) and, within the frequency band being used by a network node, transmission takes place in a slotted mode (TDMA) to create multiple channels. However, it is to be appreciated that a code division multiple access (CDMA) based scheme, or some other suitable scheme, may be employed to allow shared access to the system. It is also to be appreciated that the internode network 108, including links 110 between the network nodes may, for example, be TDMA/FDM-based, TDMA-based, CDMA-based, or some other suitable scheme.

The MAC layer allows reserved channels for those connections that need a guaranteed bandwidth and frees up the remaining bandwidth for shared contention based access making for an overall efficient operation. While the MAC layer is concerned with sharing the available bandwidth efficiently, it is not necessarily equipped to handle error control. In a high quality medium where bit or block errors are rare, it is possible to carry higher layer protocols directly on top of the MAC layer and allow the error control mechanisms built into the higher layer protocols to handle transmission errors. For instance, in local area networks with low bit error rates it is customary to carry TCP/IP directly over the MAC layer and allow the error recovery mechanisms of TCP to handle transmission errors. The wireless access medium, on the other hand, is characterized by significantly high error rates and fading (which also contributes to burst errors). Carrying higher layer protocols such as TCP/IP directly over the MAC layer in such a medium is likely to result in poor throughputs and large delays—an overall inefficient operation. Consequently, a Radio Link Protocol (RLP) layer (denoted as reference designation C in FIG. 3A) is provided on top of the MAC protocol over the wireless access segment. It is to be appreciated that the RLP layer is essentially a "conversion layer" that helps adapt the communication medium represented by the lower (MAC and Physical) layers to the requirements of the higher layer protocols (IP and above).

The RLP is mainly concerned with overcoming the effects of transmission errors in the wireless access segment to create a virtually error-free data link for those applications that require low end-to-end error rates. This is preferably achieved through a combination of error correction/detection schemes with Automatic Repeat Requests (ARQ) or Selective Repeat transmissions for error recovery over the access segment. The RLP also preferably performs segmentation and re-assembly functions to rebuild the frames handed down to it by the higher layer protocols before forwarding them to the protocol stack that will be active in the internode network.

Further, assume that the higher layer protocols are TCP at the transport layer and IP at the network layer (denoted as reference designation E in FIG. 3A). Thus, a Subnetwork layer server module in a mobile receives an IP frame for transmission from the higher layers. Now comes the issue of possible segmentation at various protocol boundaries because of different frame sizes at different layers. IP frames are typically thousands of bits long. On the other hand, the frame size for the RLP layer, which is determined by factors pertaining to the wireless access segment between mobile terminals and network nodes, is typically only a few hundred bits. In between the IP and RLP layers, the Subnetwork layer frame size is optimized for efficient transport over the internode network. This is somewhere between the RLP frame size and the IP frame size. Therefore, if the Subnetwork layer frame size is smaller than the IP frame size, the IP frame received by the Subnetwork layer is segmented, a Subnetwork layer header/trailer is added to each segment to form a Subnetwork layer frame, and then each Subnetwork layer frame is handed to the RLP layer server module. The RLP layer server module segments each Subnetwork layer frame into several subframes, then adds RLP sequence numbers, encodes these subframes for error correction/detection, and then hands them down to the MAC layer for individual transmission. The subframe size at the RLP layer is specified such as to fit into a MAC layer slot so that segmentation/re-assembly is not required at the interface between two layers. At the receiver (receiving end of the access segment, that is, in the direct network node), the MAC layer passes the subframes, corresponding to each connection, to an RLP server which checks them for possible transmission errors and sends error feedback (e.g., similar to ARQ or selective repeat) piggybacked on to frames going in the opposite direction over the same connection. When the RLP server (at the receiver side) has all of the subframes corresponding to a Subnetwork layer frame handed down to the RLP server on the transmitter side, it re-assembles the subframes into a frame and passes it on to the router module for routing within the internode network. It is to be appreciated that routing in the internode network takes place at the Subnetwork layer. Re-assembly of IP layer frames (if they are segmented into several Subnetwork layer frames) is carried out at the remote host where the IP layer is terminated.

The error control functions such as ARQ, retransmission, etc., carried out by the RLP may introduce a certain delay which may not be acceptable for many real time applications such as voice communications. Also, many of these applications are tolerant of frame errors provided the frame error rate is within a certain permissible limit. For such connections, a real time version of RLP which does not have the ARQ/retransmission functions, but, perhaps, may have additional coding for better protection against transmission errors may be employed.

As mentioned, connectionless switching is preferably employed within the inter-node network 108. Since many of the applications in the end-systems may be based on TCP/IP or UDP/IP, it would appear proper, at first glance, to employ connectionless switching based on IP within the inter-node network. However, in a highly mobile environment such as system 100, conventional IP-based routing, even with the enhancements added by Mobile IP, introduce many inefficiencies (e.g., triangular routing) in the overall operation.

Consequently, the network architecture of the present invention advantageously includes a Subnetwork protocol layer (denoted as reference destination D in FIG. 3A). The Subnetwork layer, as will be explained below, is included specifically to handle mobility management and other functions, as will be explained, in the system 100. For instance, the Subnetwork layer of the invention handles all aspects of mobility including "within call" or "in-call" mobility, thus off-loading the higher layers of mobility related concerns. This enables applications based on standard protocols such as TCP/IP to be run smoothly over the system 100 without the need for any modifications. The switching/routing functions within the internode network 108 are connectionless in the sense that there are no virtual circuits associated with connections in the internode network. However, the Subnetwork layer of the invention enables end-points of a connection (located in the nodes used for access to the internode network) to keep track of each other in the system 100.

To summarize, the main and preferred functions to be carried out by the various layers of the protocol stack of the invention, as shown in FIG. 3A, are as follows: (i) Physical Layer provides modulation, framing, synchronization, equalization, channel adaptation, and raw transport; (ii) MAC Layer provides channel arbitration, provides shared access to mobile terminals, ensures efficient use of the available bandwidth, helps maintain QoS (Quality of Service) by providing reserved bandwidth to real time applications, low level resource negotiation, and frees up unused bandwidth for contention based access (for efficiency); (iii) RLP Layer provides QOS support through error control via coding, interleaving, ARQ/Selective Repeat schemes to create a virtually error free bridge across the access segment for applications with low error rate requirements, segmentation and re-assembly to help rebuild the frames transmitted by the higher layers, ensures efficient use of the communication medium by intelligent means of error recovery, provides call/connection setup and termination procedures, and provides signaling for resource negotiation during a call; and (iv) Subnetwork Layer provides, inter alia, connectionless switching/routing within the internode network, provides mobility support to applications running across the system 100 (mobility support includes, inter alia, address queries during call setup as well as destination tracking during a call), hides mobility related issues from higher layer (IP and above) protocols to ensure smooth working in a mobile environment.

Figure 3B:
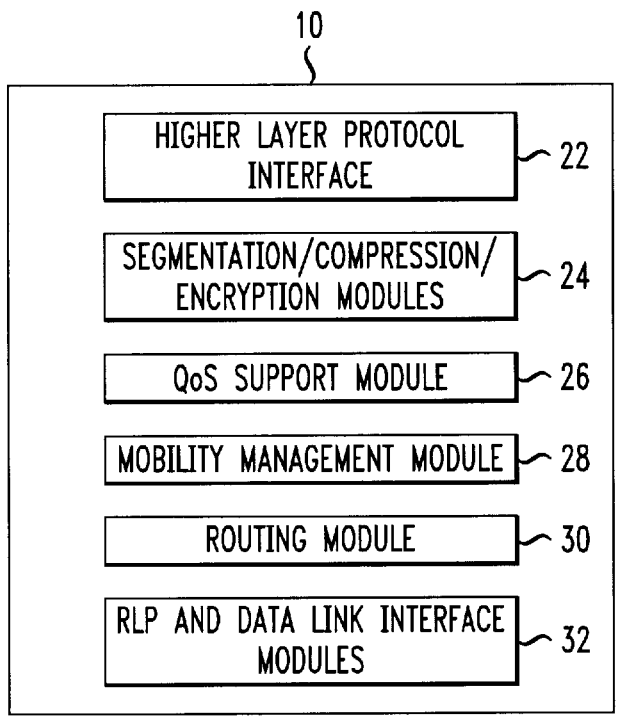
FIG. 3B is a block diagram illustrating processing modules associated with a subnetwork layer according to the invention.

Referring now to FIG. 3B, a block diagram of functional processing modules associated with the Subnetwork layer D according to an embodiment of the invention is shown. It is to be appreciated that the functional processing modules are executed on the processor 10 (FIG. 2) in cooperation with the memory 12, transceiver section 14, antenna 16, and cache 18. Alternatively, each module may have its own dedicated processor or two or more functional modules may share a processor. It is also to be appreciated that these functional processing modules reside in both a mobile 102 and a network node 104.

The Subnetwork layer D also functions as a convergence layer, which supports higher network layers such as TCP/IP, UDP, and mobile TCP. Interface to such higher layer is through a higher layer protocol interface module 22 (FIG. 3B), which provides interface functions, as known in the art, for the Subnetwork layer. However, it is to be appreciated that a network layer above the Subnetwork layer D is optional in that the Subnetwork layer may directly support a transport/network protocol, for example, mobile TCP. The segmentation, compression, and encryption modules 24 provide their respective functions as are known in such a packet-based environment. The RLP and Data Link interface modules 32 respectively provide interfacing functions to the RLP layer, described herein, and data transition between the Subnetwork layer and the physical data link between a mobile and a network node. QoS (quality of service) module 26 allows differential treatment of packets based on their QoS requirements (e.g., delay, etc.).

As will be explained below, the mobility management module 28 in cooperation with the routing module 30 provides various mobility management methodologies, as described herein, according to the invention. Depending on the configuration of the system 100, as will also be explained below, a handoff manager module is an integral part of the mobility management module 28. However, alternatively, the handoff manager module may operate via a dedicated processor. Also, while a routing processor is generally described, it is to be understood that the invention may employ source routing and may also support other data transfer methods such as, for example, tunneling, as is known in the art. Accordingly, the Subnetwork layer of the invention avoids the need for employing triangle routing of bearer traffic by using minimal signaling during call/connection setup and handoff. That is, once a call/connection is setup, packets travel over a direct path throughout the system 100.

Subnetwork Layer Addressing

The present invention provides a novel temporary-addressing scheme for the Subnetwork layer to facilitate, inter alia, routing and mobility management. Based on the temporary addresses alone, packets are routed to the destination mobiles. Additionally, during a connection/call, temporary addresses are used for route optimization as mobiles move. This addressing scheme also allows a host (e.g., mobile station) to detect the mobility of its correspondent host (e.g., mobile station) during a connection/call. A Sub-Network Layer Address (hereinafter referred to as SNLA) of a network node 104 preferably has the format of network_node_ID.interface_ID.port_ID, which does not change as the network node moves in the network, except when port designations associated with a transfer, as explained below, change. The first part of the address (i.e., to the left of the first period) is the ID (identification or identifier) of a network node. Each network node in the system 100 has its own unique ID. The second part of the address (i.e., between the first period and second period) is the ID of an interface at the network node. Such field supports the case where each interface associated with a network node needs to be identified by its own SNLA. That is, the interface ID portion of the address is used to identify the interface within the network node that the packet is being directed to. An interface in a network node refers to an end, at the node, of a physical link (e.g., point-to-point) between the network node and a neighboring node. For example, a network node may be coupled to three other network nodes and, thus, have three unique interface IDs, one for each link. It is to be appreciated that the interface ID may be a data link address associated with the particular link. The third part of the address (to the right of the second period) is the ID of the port, which identifies the application flow at the network node. In other words, this field identifies the particular application flow with which the packets being directed are associated, e.g., connection-based applications, such as voice or video, or connectionless applications, such as e-mail. It is to be appreciated that the port ID allows intermediate routers to identify an application flow and perform application-level flow-based operations such as mobility management and QoS routing. However, if communicating mobiles do not assign port Ids for an application flow, a default value is used. Application-level flows can be identified at a granularity of source and destination. Also, application-level flows can be identified at a higher network level.

On the other hand, the SNLA of a mobile station 102 preferably has the format of network_node_ID.mobile_ID.port_ID. The first part of the address (i.e., to the left of the first period) is the ID of the network node with which the mobile is currently associated. The second part of the address (i.e., between the first period and second period) is the ID of a mobile, which, like a network node, has a unique ID as compared to other mobiles in the system 100. The third part of the address (to the right of the second period) is the port ID that identifies an application flow on the mobile. It is to be appreciated that the port ID associated with each network node address and each mobile address is unique depending on the application. Thus, for each application flow (connection-based or not), the port ID is dynamically assigned by each element (e.g., mobile or network node).

It is to be appreciated that the network node 104 currently in direct communication with the mobile 102 is referred to as the direct network node. As a mobile 102 moves from one network node 104 to another, its network ID part of the SNLA changes from the ID of the old network node to the ID of the new network node. Therefore, a mobile's SNLA advantageously indicates the relative location of a mobile. Given a mobile's SNLA, packets with this SNLA as the destination are routed first towards the direct network node indicated by the SNLA and then further forwarded by the direct network node to the mobile. The network node IDs and mobile IDs are unique among themselves, respectively. In one embodiment, the mobile IDs use the mobiles' MAC addresses. However, other unique identifying schemes may be employed and are thus contemplated by the invention. Advantageously, having a unique mobile ID allows the mobile to be recognized by its correspondent mobile when its SNLA changes or when it obtains multiple SNLAs. It is to be understood that because a mobile may be in communication with more than one network node at a time (e.g., during soft handoff), the network node ID portion of the mobile's SNLA is different for each network node and, thus, the mobile has more than one SNLA associated therewith.

Given such a novel Subnetwork layer and temporary addressing scheme of the invention, as explained above, the present invention provides various methodologies for controlling mobility management in the system 100. Such methodologies are functionally divided and described below in corresponding sections of the detailed description. Specifically, mobility management according to the invention is explained according to three separate functions: (i) location management; (ii) mobile access; and (iii) in-call mobility management.

Location Management

Figure 4:
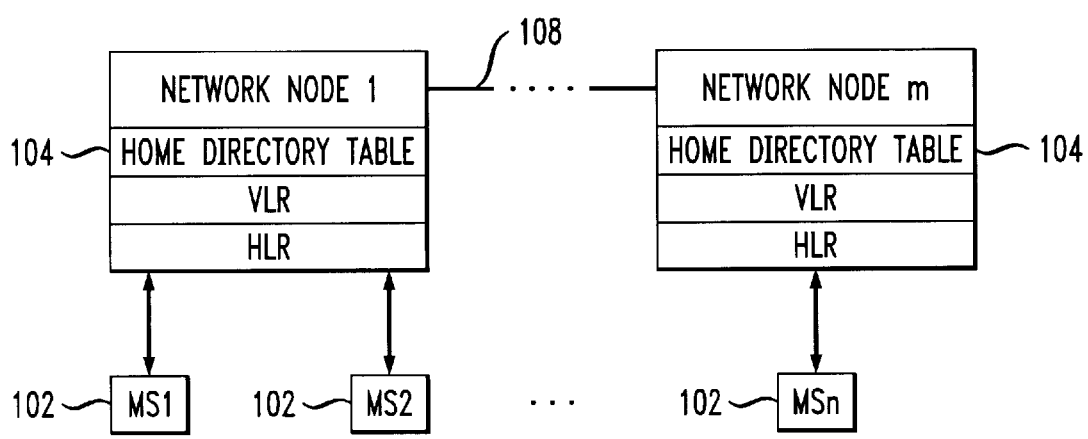
FIG. 4 is a block diagram of a portion of a mobile communications system illustrating location management according to an embodiment of the present invention.

Location management is concerned with updating mobiles' locations and searching for the mobiles when the system 100 loses track of them. The present invention provides an approach where Home Location Registers (HLRs) and Visitor Location Registers (VLRs) are used to track the locations of individual mobiles. Referring to FIG. 4, a block diagram illustrating elements involved in location management in system 100 is shown. It is to be understood that there are preferably a plurality of HLRs in system 100. While an HLR can reside on any network node, it is to be appreciated that the location and the number of the HLRs may impact the performance of mobility management. Therefore, depending on the number of mobiles and network nodes in the system, certain network nodes include an HLR. In the case shown in FIG. 4, network node 1 and network node m include an HLR. Each mobile station (MS) is assigned an HLR. A table (e.g., Table I) is stored in the HLR containing the following fields: mobile's host name, mobile's unique ID, mobile's SNLA(s), the time the entry was created and the expiration time.

TABLE I

| Mobile Hostname | Mobile ID | Mobile SNLA | Entry Time | Expiration Time |
|---|---|---|---|---|
| host1.org1.mil | 356778 | 2041.356778.0 | 6:00:00 | 9:00:00 |
| host2.org1.mil | 356706 | 2041.356706.0 | 4:11:35 | 7:00:00 |
| host1.org2.mil | 350012 | 2041.350012.0 | 3:01:47 | 6:00:00 |
| host2.org2.mil | 350051 | 2041.350051.0 | 5:00:00 | 8:00:00 |

The first two fields are unique and serve as keys for searching the table. Note that the HLRs maintain the location of a mobile only through the network node it is currently attached to i.e., the direct network node. Only if the mobile's point of attachment changes, then the mobile's HLR needs to be updated. The relative movement among network nodes does not affect the mobiles' HLRs though it will invoke routing updates. If a mobile moves to another network node, it sends a location update message to its HLR. Also, a network node itself may move out of range, losing all mobiles attached to it. In this case, the mobiles will try to connect with the neighboring nodes. Depending on the availability, some mobiles may be able to connect to the neighboring nodes. To minimize the number of location update messages, each neighboring node sends location update messages to the HLRs of all the newly joined mobiles (via the internode network 108), lumping the mobiles that belong to the same HLR together in one location update message.

Next, the procedure of how a mobile or a network node determines where another mobile's HLR is located is explained. Each network node maintains an identical Home Directory table (e.g., Table II) which is a hash table that maps a mobile's host name to its HLR. For example, the table may consist of three fields: mobile's ID (partial or complete), mobile's host name (partial or complete), and the SNLA of the mobile's HLR.

TABLE II

| Mobile ID | Mobile Hostname | HLR SNLA of Mobile |
|---|---|---|
| 000000-299999 | org1.mil-org9.mil | 31.0.0 |
| 300000-399999 | org10.mil-org19.mil | 40.0.0 |
| 400000-499999 | org20.mil-org29.mil | 1000.0.0 |

The table can have as few rows as the number of HLRs in the network. The network node performs the closest match on the host name or mobile ID. The table can be configured manually by a network administrator and changes infrequently.

An HLR may lose track of its mobiles for several reasons. Reasons for this may be, for example, the HLR entry for the mobile has expired, a mobile stopped sending location updates, or the HLR is informed by other network nodes or other mobiles that the SNLA of its mobile is erroneous. In this case, the HLR is responsible for searching for the mobile. The most common approach is to page the mobile as in the cellular/PCS networks. There is much literature on paging in cellular/PCS networks, e.g., G. Wan et al., "A Dynamic Paging Scheme for Wireless Communication Systems," ACM/IEEE MOBICOM'97, pp. 195–203 (1997); and S. Tabbane, "Evaluation of an Alternative Strategy for Future High Density Wireless Communications Systems," Wireless Information Network Laboratory (January 1993). Many paging algorithms attempt to locate the mobile with minimal delay and minimal cost by trading off location updates and paging. The cost may include the number of paging messages, bandwidth, database transactions, etc. There is a direct tradeoff between frequency of location updates and paging cost. If an HLR receives an update every time a mobile moves, then there is no need to page. If a mobile does not update its HLR at all when it moves, then paging may be needed whenever the mobile is accessed. In sophisticated paging systems, an HLR often keeps a mobility profile of each mobile it tracks. The profile includes the mobility pattern of a mobile, such as the probability of being at a certain location at a certain time. Thus there is no need to send a location update to its HLR, if a mobile moves in a manner predictable by its HLR. In addition, a network node may cache (cache 18 in FIG. 2) the SNLAs of mobiles by monitoring packets generated by those mobiles passing through the node in the last time interval. The interval is made short enough to ensure a small cache table. Also, it is optional whether or not to cache the port ID portion of the address. The paging messages sent by the HLR is examined by each receiving router. If the router has the mobile in its cache and the SNLA is different from the erroneous SNLA in HLR, it will send a reply message to the HLR with the mobile's SNLA and stop forwarding the paging message. The HLR may receive multiple SNLAs for the mobile. The HLR may decide to page the few areas indicated by the SNLAs and thus narrow the search scope.

Each network node also maintains a VLR that records information on mobiles that are within its coverage area and have registered with it. When mobiles move from one network node to another, the new network node adds the mobile to its VLR and informs the previous network node to delete the mobile in the old VLR. It is to be appreciated that the HLR, the VLR, and the Home Directory table may be stored and updated in memory 12 (FIG. 2) of the network node 104.

Mobile Access

Mobile access addresses how a mobile station initiates communications with a host, e.g., another mobile station. To support multimedia applications over the packet-switched wireless system 100, mobile access needs to be as flexible as possible so that different applications can use the access method best suited for them. The present invention provides two mobile access methodologies. One method allows mobiles to go through a complete access procedure by looking up the SNLA of a correspondent mobile in order to setup a connection. The other method allows mobiles to directly send traffic without knowing the exact location of a correspondent mobile. The two methods are respectively referred to as: (i) complete mobile access; and (ii) direct mobile access.

(i) Complete Mobile Access

For complete mobile access, a mobile determines the SNLA of the correspondent mobile through a set of signaling exchanges before it initiates communication with the correspondent mobile. Complete mobile access requires longer connection/call setup time and incurs more signaling overhead than direct mobile access. On the other hand, it enables traffic to flow directly to the correspondent host. Therefore, this method may preferably be employed for real-time traffic and data traffic with long connection time.

It is to be appreciated that the port ID of the SNLA need not be looked up. The port ID of a mobile's SNLA is dynamically assigned for each application flow by the mobile. The initiating mobile may first use a default value for the port ID until the corresponding mobile assigns a port ID for the flow. Upon receiving the port ID from the corresponding host, the initiating mobile then replaces the default port ID with the assigned port ID in the destination SNLA field of the outgoing packets. Locally, the initiating mobile may assign a port ID for the application flow and use the port ID in the source SNLA field of the outgoing packets.

Figure 5A:
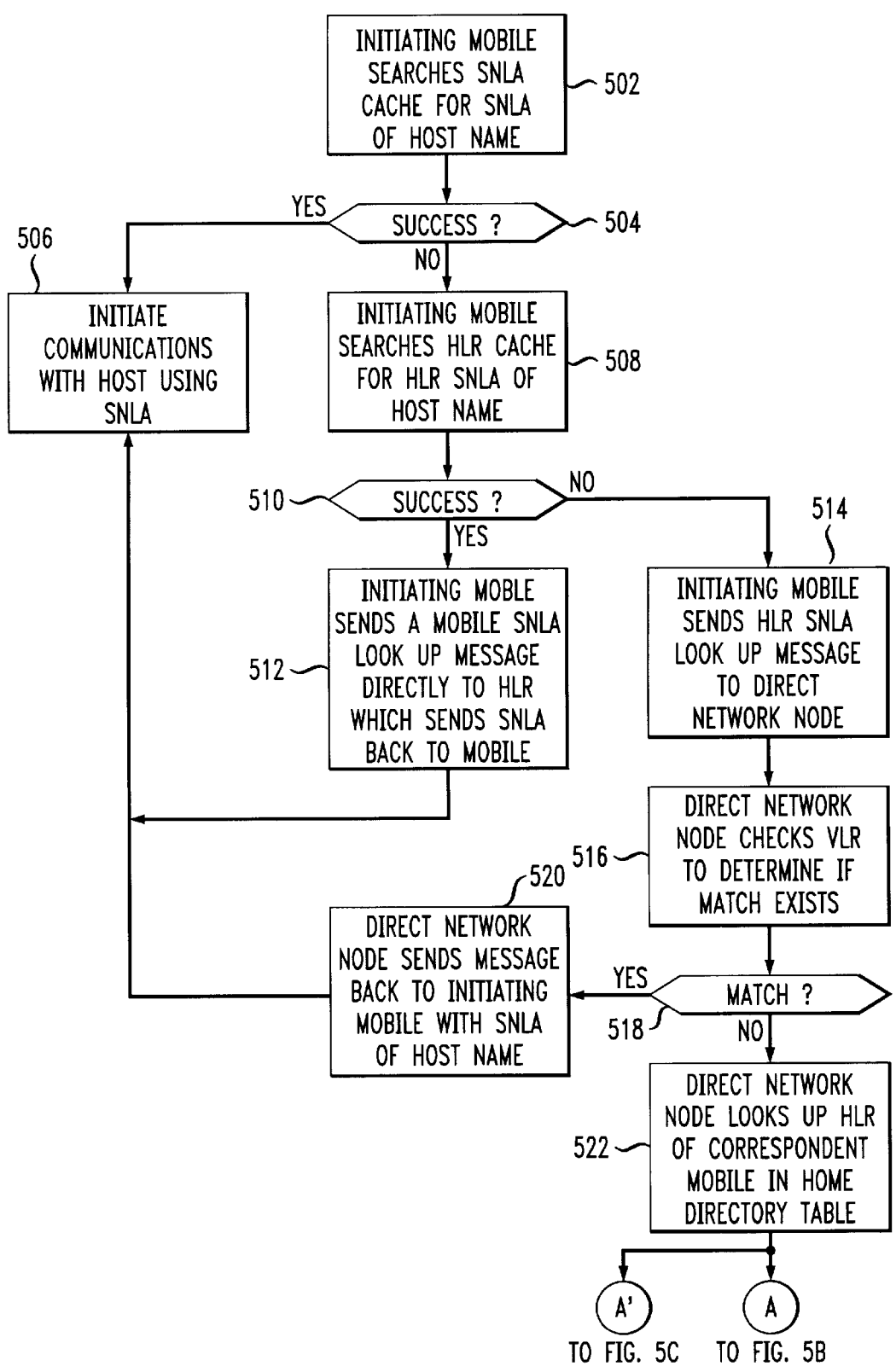
FIGS. 5A through 5C are flow charts of mobile access methods according to embodiments of the present invention.
Figure 5B:
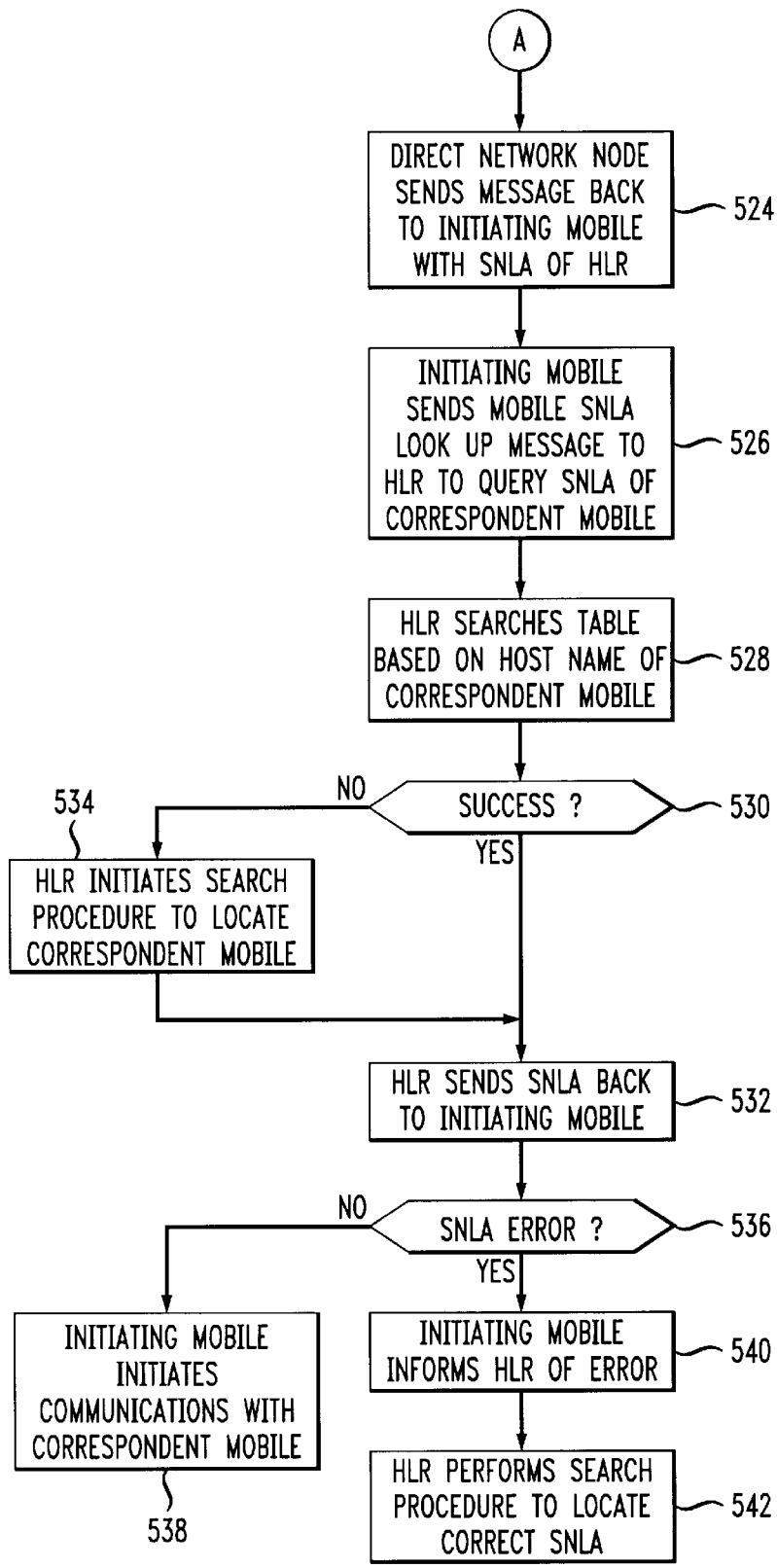

Referring now to FIGS. 5A through 5B, a flow chart of an embodiment of a complete mobile access method 500 is shown. A mobile starts with the host name of the mobile it intends to contact. The following steps illustrate a straightforward method on how to look up the SNLA of a correspondent mobile. The initiating mobile first searches its SNLA cache for the SNLA of the host name (step 502). A mobile preferably maintains a cache (cache 18 of FIG. 2) of some frequently used SNLAs which expire after sometime. If successful (step 504), no mobile access procedure is needed and the initiating mobile initiates communications with the host using the SNLA as the destination address (step 506). If not successful in step 504, the mobile searches an HLR cache (also in cache 18) for the HLR SNLA of the host name (step 508). A separate cache that lists the frequently used HLR SNLAs is also useful. If successful (step 510), the mobile sends a mobile SNLA lookup message directly to the HLR, which then sends the SNLA of the correspondent mobile back to the initiating mobile (step 512). The initiating mobile then initiates communication with the correspondent mobile in step 506. If not successful in step 510, the initiating mobile sends an HLR SNLA lookup message to the direct network node to query the HLR location of the correspondent mobile (step 514). The message includes the host name whose SNLA needs to be discovered.

The direct network node first checks its VLR to see if there is a match to the host name (step 516). If a match is found (step 518), the direct network node sends a message back to the initiating mobile with the SNLA of the host name (step 520). If no match is found in step 518, the direct network node looks up the HLR of the correspondent mobile from the home directory table (step 522), which maps a mobile to its HLR. The direct network node then sends a message back to the initiating mobile with the SNLA of the HLR (step 524). Upon receiving the message back from the direct network node, the initiating mobile sends a mobile SNLA lookup message to the HLR to query the SNLA of the correspondent mobile (step 526).

In step 528, the HLR searches its table based on the host name of the correspondent mobile. If the lookup is successful (step 530), the HLR sends a message back to the initiating mobile with the SNLA of the correspondent mobile (step 532). If the lookup is not successful, e.g., the HLR's SNLA entry for the host name has expired, the HLR initiates a search procedure for the correspondent mobile, for example, as described above in the Mobile Access section of the detailed description (step 534). Once the correspondent mobile is found, the HLR sends the SNLA of the correspondent mobile to the initiating mobile in step 532. Now, the initiating mobile can send packets directly to the correspondent mobile using the SNLA as the destination address. If the SNLA of the correspondent mobile is correct (step 536), the mobile access part is completed and the initiating mobile initiates communications with the correspondent mobile (step 538). If the SNLA given by the HLR turned out to be erroneous (step 536), the initiating mobile informs the HLR of the error (step 540), which may result in a mobile search by the HLR (step 542). The initiating mobile may try again at a later time.

Figure 5C:
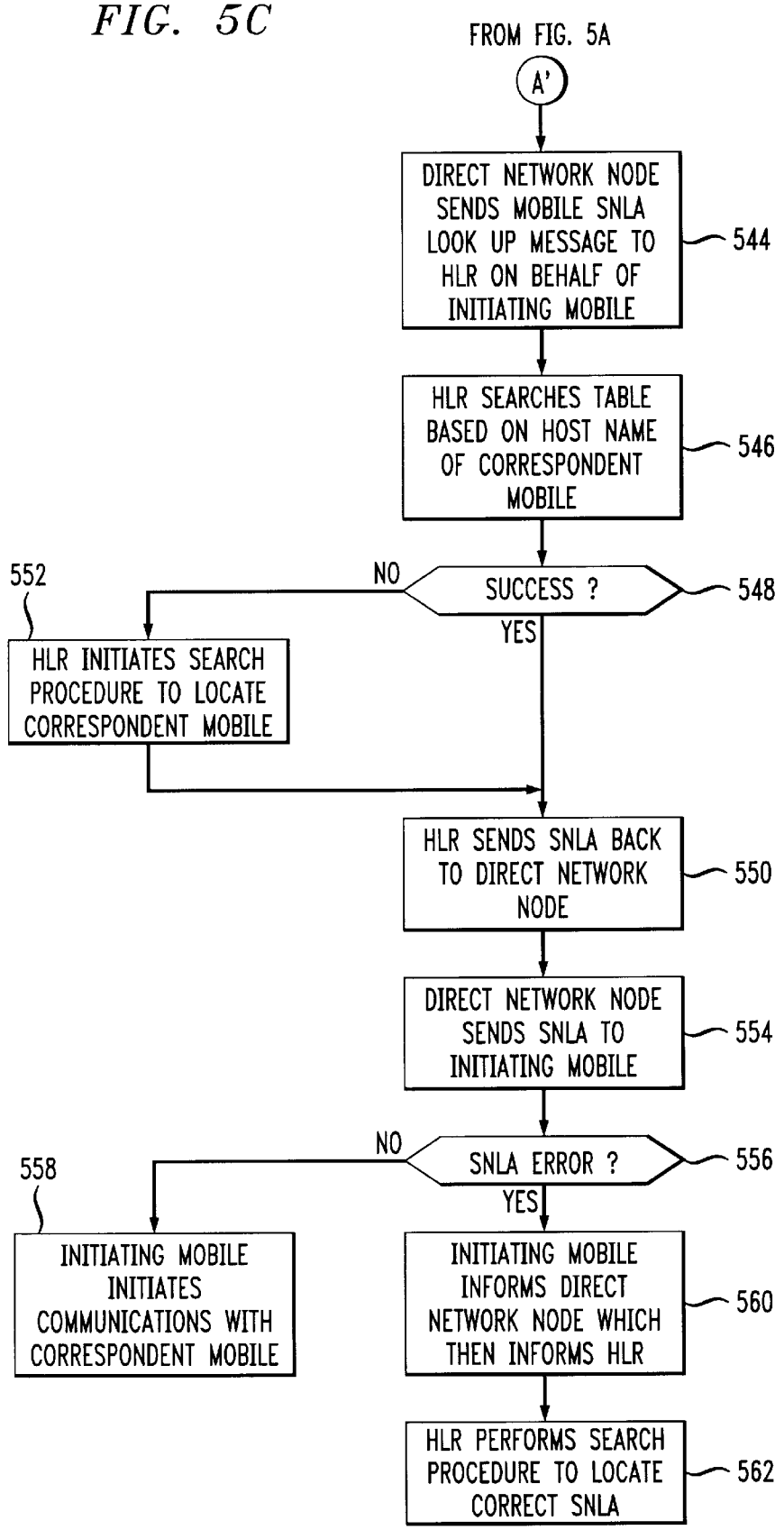
Figure 6A:
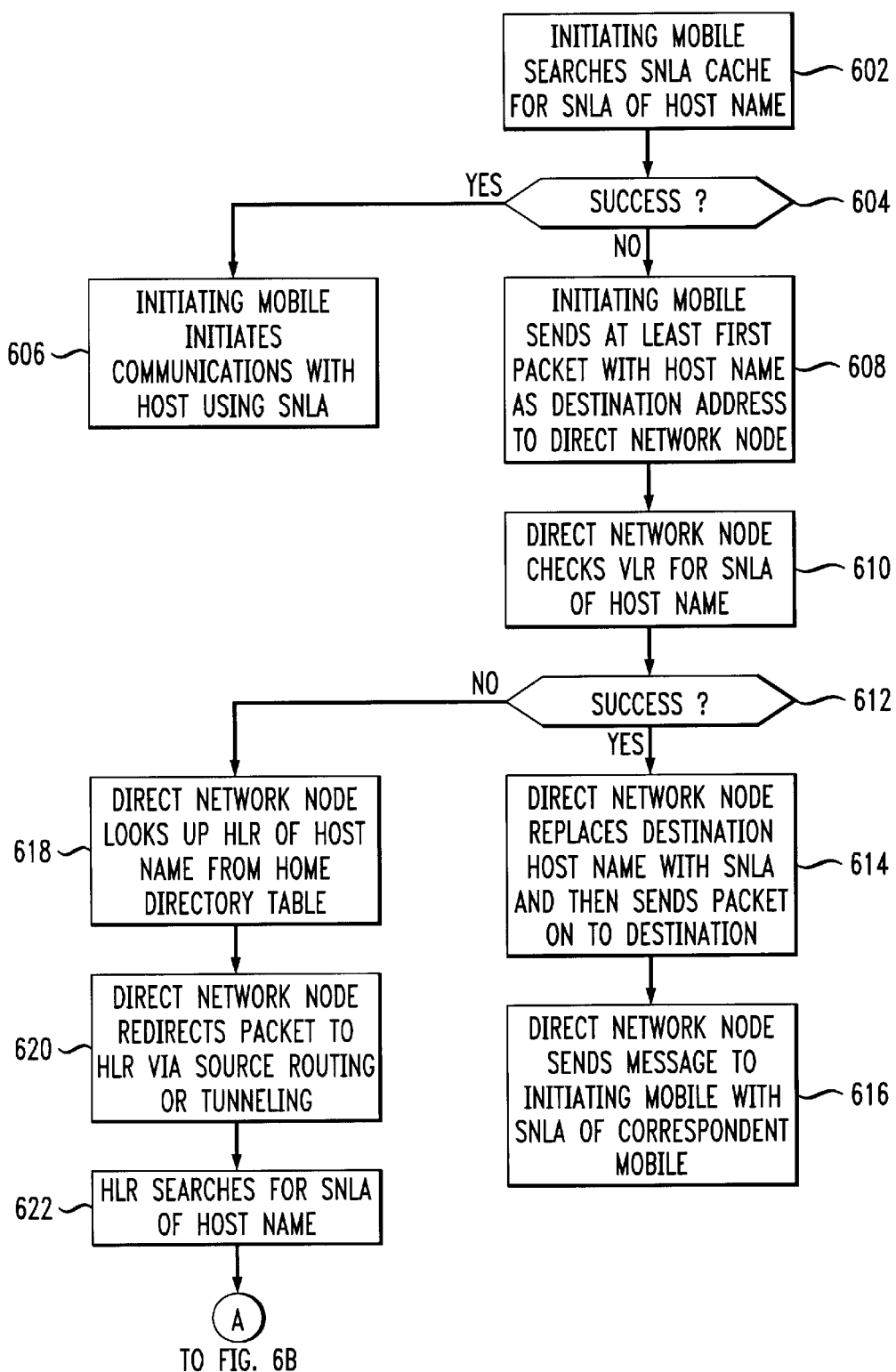
FIGS. 6A and 6B is a flow chart of a mobile access method according to another embodiment of the present invention.
Figure 6B:
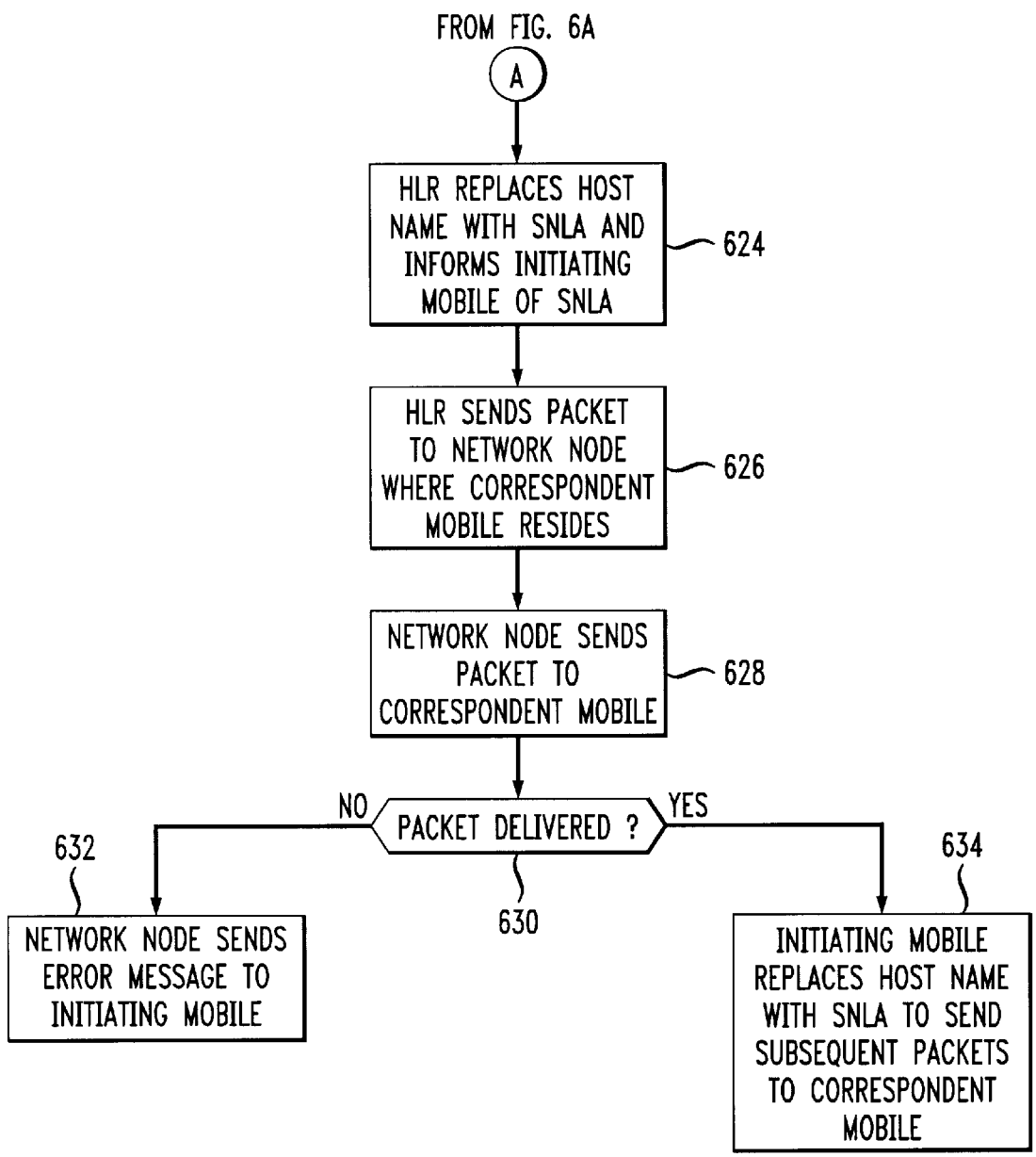

One of ordinary skill in the art will realize that there are several variants to the complete access method described above. For instance, instead of the direct network node sending the SNLA of the HLR back to the initiating mobile (in step 524 of FIG. 5B), the direct network node may send a mobile SNLA lookup message to the HLR on behalf of the mobile. In the other direction, the direct network node forwards the SNLA of the correspondent mobile back to the initiating mobile. This alternative embodiment reduces the number of signaling messages needed for mobile access. Such alternative embodiment is illustrated in FIG. 5C. That is, after step 522 in FIG. 5A, the direct network node sends a mobile SNLA lookup message to the HLR on behalf of the initiating mobile (step 544). The HLR searches its table for the SNLA based on the host name of the correspondent mobile (step 546). If the SNLA is found (step 548), the HLR sends the SNLA back to the direct network node (step 550). If the SNLA is not found in step 548, the HLR initiates a search procedure for the correspondent mobile, for example, as described above in the Mobile Access section of the detailed description (step 552). Once the correspondent mobile is found, the direct network node sends the SNLA of the correspondent mobile to the initiating mobile (step 554). Now, the initiating mobile can send packets directly to the correspondent mobile using the latter's SNLA as the destination address. If the SNLA of the correspondent mobile is correct (step 556), then the mobile access part is completed and the initiating mobile initiates communications with the correspondent mobile (step 558). If the SNLA given by the direct network node turned out to be erroneous (step 556), the initiating mobile informs direct network node which then informs the HLR of the error (step 560). The HLR then begins a mobile search (step 562). The initiating mobile may try again at a later time. (ii) Direct Mobile Access Referring now to FIGS. 6A and 6B, a flow chart of an embodiment of a direct mobile access method 600 is shown. In the direct mobile access method, after unsuccessfully attempting to obtain the SNLA of the correspondent mobile as a first step, the initiating mobile sends out packets directly to the correspondent mobile using the mobile's host name (not SNLA) as the destination. The HLR of the correspondent mobile and other network nodes are responsible for routing to the destination the packets which use host name in place of address. The initiating mobile is informed of the SNLA of the correspondent mobile either by the HLR or by a network node, whichever locates the mobile. Alternatively, the correspondent mobile may inform the initiating mobile of its SNLA via a packet received therefrom. That is, if the initiating mobile receives a packet from a mobile it intends to contact, the initiating mobile can pull out the correspondent mobile's SNLA from the source address in the received packet.

The host name address is then replaced by the SNLA in the subsequent packets sent by the initiating mobile. This access method enables fast mobile access and significantly reduces signaling overhead. However, bearer packets may risk being lost due to incorrect SNLAs. In addition, packets with a host name as destination may take an indirect route to the destination for a short period of time. This method may preferably be employed for connectionless bearer traffic and short bursty connections/calls. Also, the direct mobile access method can be used to send the first signaling message from the initiating mobile for initiating long duration calls. Once, the initiating mobile receives a response packet from the correspondent mobile, the initiating mobile can use the SNLA extracted from the correspondent mobile's response to direct subsequent packets. In the high mobility environment of the system 100, this method provides a flexible and lightweight approach to mobile access.

To support using host name as destination, a new address type is defined in the Subnetwork layer. A source or destination address is in the form of either an SNLA or a host name. Using host name as a source address allows a mobile to include a host name in its packets so that the destination does not need to perform a host name lookup on the source using the source's SNLA. Hostname lookup is required in many TCP/IP applications (the reverse lookup of host name from the IP address at the destination). Table III and IV show the format for both the SNLA and host name types of addresses.

TABLE III

| Type of address | SNLA |
| --- | --- |

TABLE IV

| Type of address | Type of host name | Length of host name | Host name |
| --- | --- | --- | --- |

The "type of address" field indicates whether the address following the field is an SNLA or a host name. For example, this field may be one bit and if set to a logic 1, this indicates that address is an SNLA, if set to logic 0, this indicates the address is a host name. If the address is an SNLA, then the following "length of host name" field is a fixed-length SNLA. If the address is a host name, then the "length of host name" field indicates the length of the host name in bytes. It is to be appreciated that, when employing a host name, various types of host names may be used. Thus, a "type of host name" field is preferably included. Therefore, the host name may be, for example, an IP host name or a generic host name. Lastly, a field containing the host name itself is included. Also, it is to be appreciated that the port ID portion of the SNLA is handled in the same manner as described above with respect to the complete mobile access method. The following steps describe how direct mobile access according to the invention is preferably accomplished.

First, the initiating mobile searches its SNLA cache for the SNLA of the host name (step 602). If the SNLA is found (step 604), the initiating mobile goes ahead with initiating communications with the intended recipient mobile using the retrieved SNLA (step 606). If there is a cache miss (step 604), i.e., the mobile does not find the SNLA of the intended recipient mobile, the initiating mobile sends at least the first packet with the correspondent mobile's host name as the destination address to the direct network node (step 608). The mobile may choose to send the subsequent packets using the host name. However, as will be explained, the initiating mobile can wait to be informed of the SNLA before sending the next packet if, for example, the information therein is sensitive to packet loss.

Upon receiving the packet, the direct network node recognizes that the destination address is a host name. It passes the packet up to its mobility management module (part of he Subnetwork layer of FIG. 3) in the protocol stack. The mobility management module checks its VLR to see if it has the SNLA of the host name (step 610). If yes (step 612), the direct network node replaces the destination host name with the destination SNLA and then passes the packet down to its routing module (also part of the Subnetwork layer of FIG. 3) to be routed to the destination (step 614). In addition, the network node sends a message to the initiating mobile with the SNLA of the correspondent mobile (step 616). If the direct network node does not know the SNLA of the host name (step 612), it looks up the HLR of the host name from the home directory table (step 618) and then redirects the packet to the HLR using one of two methods (step 620). The direct network node may insert the SNLA of the HLR as an intermediate destination in front of the destination host name and use loose source routing as in IP to route the packet to the HLR. Or the immediate network node may tunnel the packet to the HLR, as is known in the art.

First, the HLR has to de-capsulate the packet if tunneling is used. Then, it finds the SNLA of the host name from its HLR database (step 622), and replaces the host name with the SNLA (step 624). It also informs the initiating mobile of the host name's SNLA (step 624). From the HLR, the packet is routed to the network node where the correspondent mobile resides (step 626). The network node then forwards the packet to the correspondent mobile (step 628). If the packet is undeliverable (step 630), the packet is dropped and an error message is sent back to the initiating mobile (step 632). After receiving the SNLA, e.g., from the direct network node, the HLR, or the correspondent mobile, the mobile switches to using destination SNLA immediately for subsequent packets (step 634). If a mobile receives an error message indicating the packet is undeliverable, it needs to inform the network node or the HLR whichever issued the SNLA. The mobile may try again later.

Figure 7:
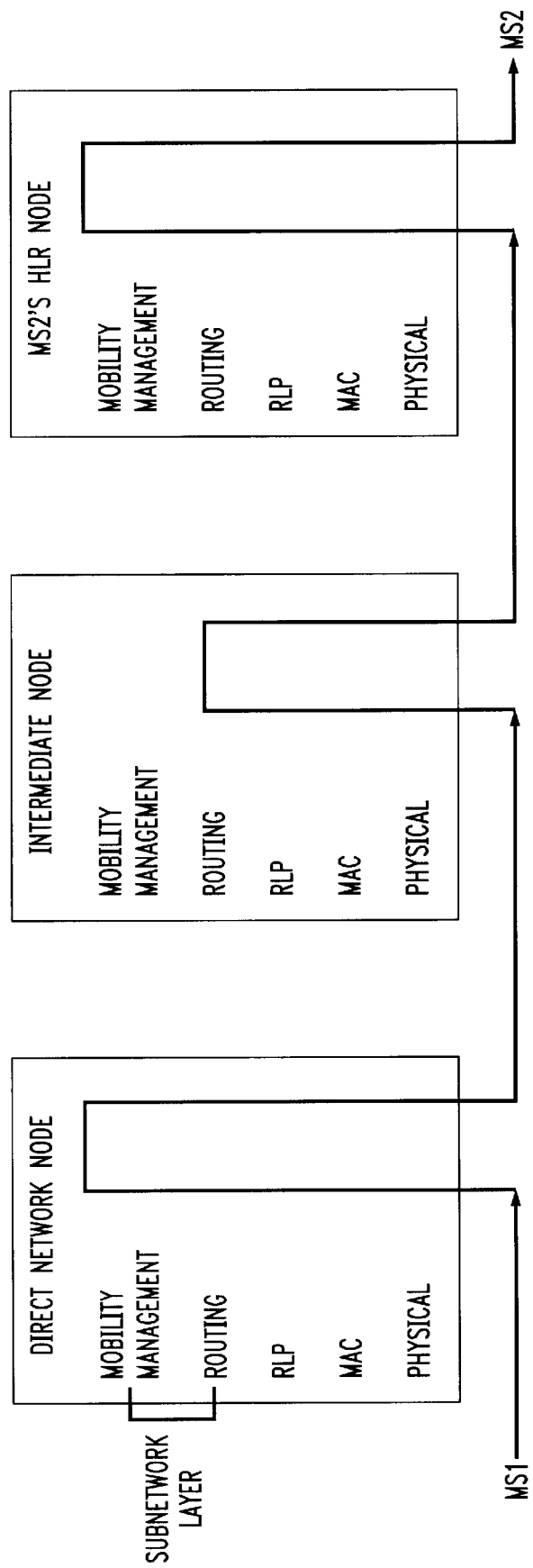
FIG. 7 is a block diagram illustrating a packet traveling path using the mobile access method illustrated in FIGS. 6A and 6B.

Referring to FIG. 7, a block diagram illustrates a traveling path of a packet using the direct mobile access method, where MS1 is the initiating mobile and MS2 the correspondent mobile. When the routing module of the direct network node receives the packet with a host name as the destination, it passes the packet to the mobility management module where the VLR and the Home Directory reside. After the SNLA of MS2's HLR is looked up from the home directory table, the packet is passed down to the routing module and is routed to MS2's HLR either through source routing or tunneling. The packet goes through some intermediate nodes where it only goes up to the routing module. At the HLR node, the packet is again passed onto the mobility management module where the HLR table resides. After the SNLA look up, the packet is routed to MS2.

Note that the above method involves little signaling overhead. Only one message is needed to inform the initiating mobile of the SNLA under normal circumstances. The route inefficiency could last as short as a round-trip time from the initiating mobile to the direct network node and as long as the worst of the two round-trip times, which could be between the two mobiles, or between the initiating mobile and the HLR. In addition, packets sent out with a host name as destination are subject to loss.

In-call Mobility Management

In-call mobility management addresses the issues of how to ensure the continuity of a connection/call when a mobile hands off from one network node to another. In addition, routes should be optimized during or after a handoff. Sometimes, it is desirable to be able to shield a correspondent node of a mobile's mobility. For example, the correspondent node may not be aware of or can not handle mobility. The in-call mobility management methodologies of the invention address these and other issues.

It is to be appreciated that one of the advantages of the addressing scheme of the invention, described above, is that the SNLA itself indicates the relative location of a mobile. Therefore, if a mobile moves (i.e., attaches itself to a new network node) during a call, it automatically changes the source address to the new SNLA in its packets. Since the correspondent mobile can recognize the mobile from the mobile ID portion of the SNLA, it knows that the mobile has changed its location. Therefore, the correspondent mobile stamps the destination field of its packets with the new SNLA. Without extra signaling messages, mobile locations are updated during a call. Since the system 100 is a packet-switched network and each packet is routed directly to the destination, the route is optimized automatically as well. This feature reduces the amount of signaling traffic significantly since a majority of the traffic, such as TCP/IP connections and voice calls, are two-way traffic.

Handoff management is the centerpiece of in-call mobility management. Each network node is equipped with a handoff manager module that is responsible for collecting relevant information from neighboring nodes. Mobiles communicating with the network node also assist in handoff decisions by providing signal strength information from neighboring nodes. Based on the information at its disposal, the handoff manager makes the decisions as to when and to which node a mobile should handoff In the network architecture of the invention, it is assumed that when a mobile hands off to a different network node, its SNLA changes (assuming it is a hard handoff). Since the routing within the internode network 108 is connectionless, there is no need to reset the end-to-end path between the mobile and the correspondent host. However, the correspondent host needs to be informed of the new SNLA of the mobile. As discussed above, the source address portion of the Subnetwork layer header keeps the correspondent host informed of the change of the mobile's address without additional signaling messages.

If handoffs are frequent during a call/connection, there is a need to frequently update correspondent nodes on the changes in the mobile's SNLA. We can substantially reduce the frequency of these updates through the use of "anchors." Anchors, as is known, are used in cellular networks to reduce the need to reset the land-line portion of a circuit when a mobile hands off to a base station that is attached to a different switch (MSC). When such a handoff takes place, only a new inter-MSC circuit (and, of course, a base station-to-MSC connection) needs to be set up, leaving a major portion of the end-to-end circuit intact. In the present invention, the anchor for a mobile could be a node it was directly communicating with at some point in time, usually at the beginning of a call, although not necessarily so. When a call/connection is set up, the remote host is provided with the SNLA of the mobile's anchor (e.g., from the source address). Later, even when the mobile undergoes handoffs, the remote host is not necessarily informed of the actual address of the mobile so that it continues to send data packets to the anchor node which is responsible for forwarding them to the actual node in direct communication with the mobile. Of course, for this scenario to be possible, the anchor needs to be aware of the actual SNLA(s) of the mobile.

There are many advantages to employing an anchor according to the invention for a mobile during a call. First, the anchor of a mobile can shield the correspondent mobile from the mobile's mobility and thus possibly reduces the amount of end-to-end signaling exchanges. Second, an anchor simplifies handoffs and provides better call continuity by acting as an end point of the data link between the mobile and the network. In soft handoffs, an anchor may also perform packet/frame selection for packets flowing out of the mobile to the network and packet/frame duplication for packets flowing into the mobile. With soft handoffs, a mobile can be in direct communication with multiple nodes simultaneously. In one direction, packets transmitted by the mobile are received by all of these direct network nodes independently. The direct network nodes forward their received packets to the anchor node, which selects the best of the received packets according to some quality metric and then forwards them to the remote node. In the other direction, for each packet received, the anchor node makes multiple copies for distribution to the direct network nodes, which then send the copies off to the mobile where packets are selected or combined. If a radio link protocol (RLP) is to be used below the Subnetwork layer to overcome the high error rate of the wireless access segment, the anchor node with its frame selector/duplicator function could be used for termination of the RLP. It is to be appreciated that tunneling can be used to transport RLP frames between the anchor and the direct network nodes involved in soft handoff.

However, not all applications need an anchor. For example, an anchor may be too cumbersome for short connectionless traffic. While it is natural to have an anchor on a per mobile basis, the present invention generalizes this concept to allow anchors on a per call or per connection basis. This is consistent with the capability of the mobiles to engage in several simultaneous connections, some of which may benefit from anchors while others may not.

If soft handoffs are not to be used, the node in direct communication with the mobile is the best place to terminate RLP from the viewpoint of implementation simplicity. In this case, the direct network node is responsible for assembling Subnetwork layer packets from RLP frames in the uplink direction. The assembled Subnetwork layer packets are sent directly to the remote node or routed via the anchor for consistency. Whenever the mobile is handed off to a new direct network node, it reestablishes the RLP with the latter. Thus, even if some higher layer packets in transit at the time of the handoff are lost, they can be recovered through higher-level recovery procedures. If an anchor node changes relatively less frequently, terminating the RLP at the anchor has several advantages. In this scenario, the RLP remains intact during the handoff procedure so that any RLP frames that may be lost during the handoff are recovered via RLP level recovery procedures which are faster and more efficient than higher level procedures.

Although the concept of an anchor is introduced to hide the changes in a mobile's actual location from remote hosts, there are times when the anchor of a mobile needs to be changed. For instance, if the mobile has moved far from its anchor, routing traffic via the distant anchor results in a highly inefficient use of network resources. Consequently, the anchor needs to be moved to a node that is located close to the mobile's current location. Of course, when the anchor is changed, the remote hosts have to be informed of this change. Since the Subnetwork layer header of packets originating from the mobile includes the identifier of the new anchor, the remote node can be made aware of the change of anchor without the need for additional signaling. When an anchor change takes place, the old anchor may continue to receive packets from the remote hosts (which are now expected to reach the mobile via the new anchor). In that case, the old anchor for some time continues to forward them to the mobile via the direct network node(s).

Figure 8A:
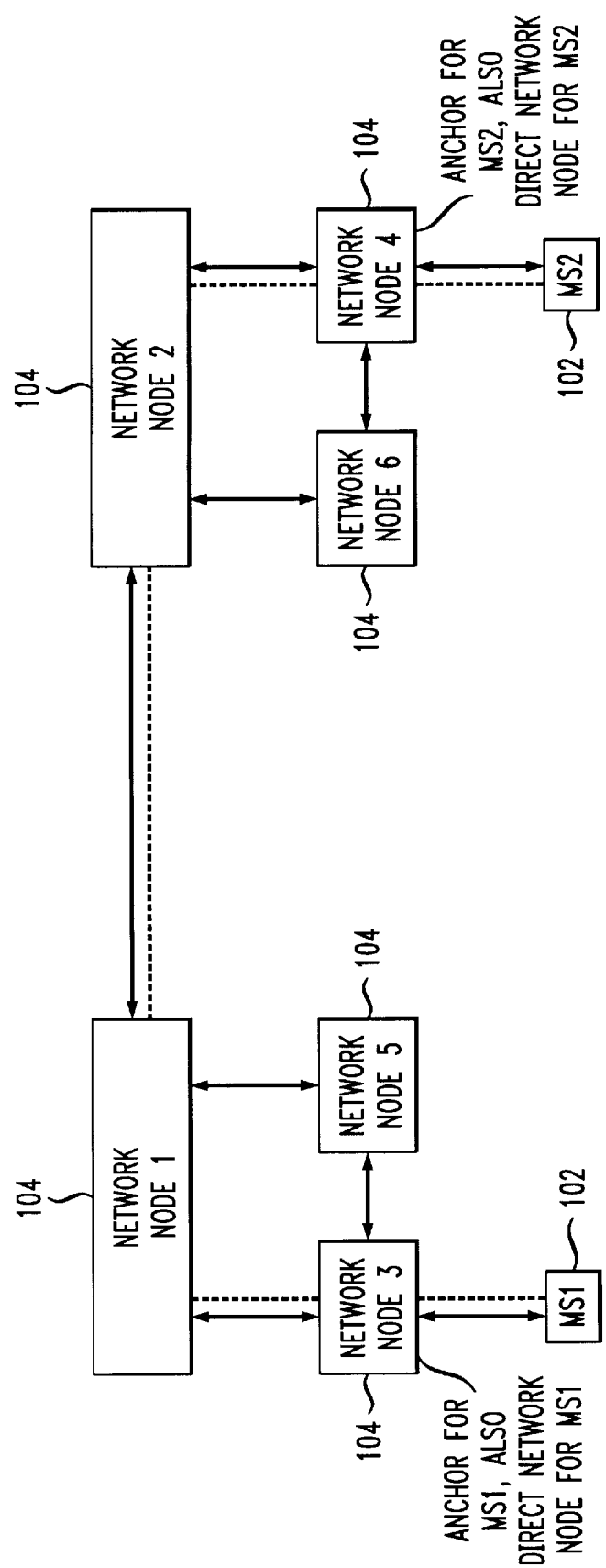
FIGS. 8A and 8B are block diagrams of a portion of a mobile communications system illustrating in-call mobility management according to an embodiment of the present invention.
Figure 8B:
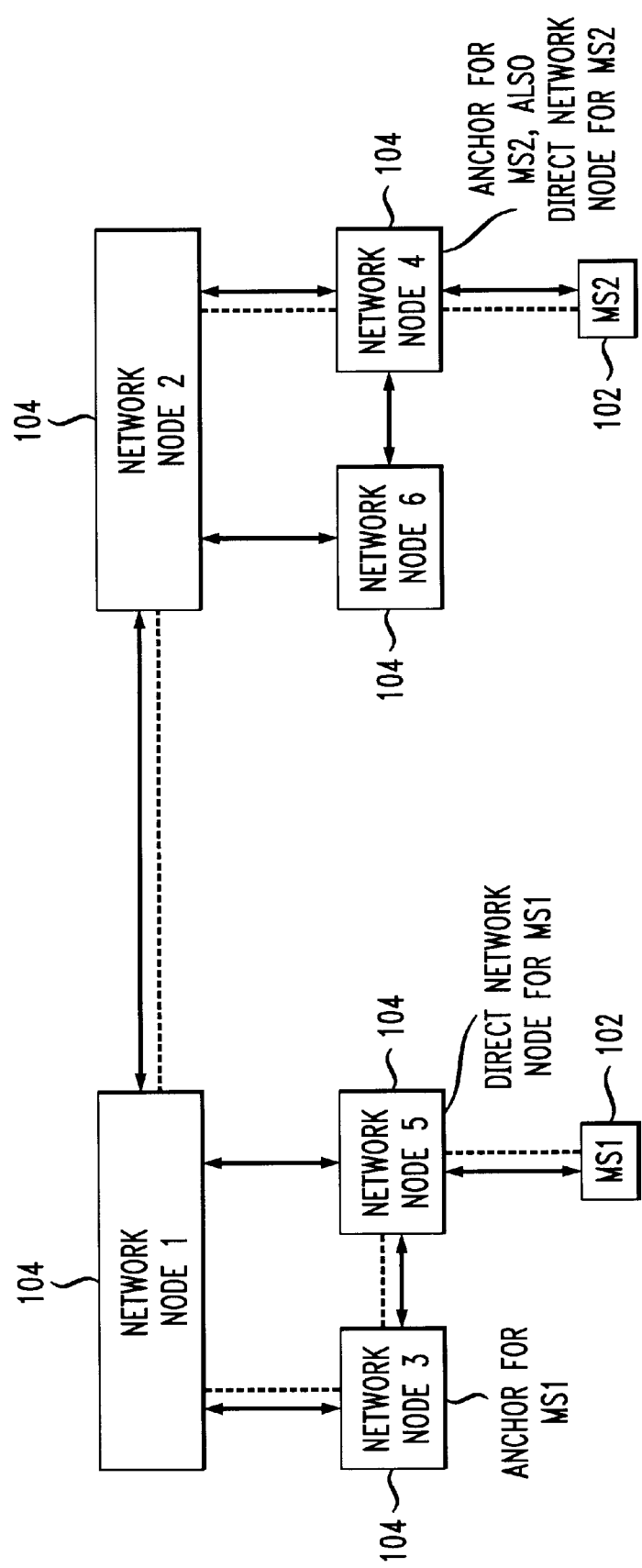

Referring now to FIGS. 8A and 8B, an example of the use of anchors in the multimedia mobile network, according to an embodiment of the invention, is shown. FIG. 8A shows the network configuration at the beginning of a call between mobile stations MS1 and MS2, which are in direct communication with network nodes NN3 and NN4, respectively. It is to be appreciated that, in addition to serving as respective direct network nodes to MS1 and MS2, NN3 and NN4 also serve as anchors for MS1 and MS2, respectively. Thus, when a call between MS1 and MS2 is established, the SNLA of MS1, passed to MS2, is NN3.MS1 and the SNLA of MS2, passed to MS1, is NN4.MS2. Therefore, the data traffic destined for MS1 is sent by MS2 to NN3 which then passes it on to MS1. An exemplary path (denoted by dashed lines) is MS2 to NN4 to NN2 to NN1 to NN3 to MS1. Similarly, the data traffic destined for MS2 is sent by MS1 to NN4 which then forwards it to MS2. An exemplary path (denoted by dashed lines) is MS1 to NN3 to NN1 to NN2 to NN4 to MS2.

Referring now to FIG. 8B, the network configuration is shown of the case where MS1 undergoes a hard handoff such that MS1 is in direct communication with NN5. It is to be appreciated that hard handoff may be accomplished in any conventional manner whereby MS1, NN3 and NN5 are each informed of the handoff, e.g., signaling between mobile stations and network nodes, as is known in the art. After handoff, MS1's link with NN3 no longer exists. However, NN3 continues to serve as the anchor for MS 1, which advantageously means that MS2 need not be informed of the new SNLA of MS1 (which is now NN5.MS1). Therefore, MS2 continues to send the data traffic meant for MS1 to the network node NN3, which then forwards it to MS1 via its current direct network node NN5. The dashed line in FIG. 8B shows the new exemplary data path for the traffic flowing from MS2 to MS1.

Although illustrative embodiments of the present invention have been described herein with reference to the accompanying drawings, it is to be understood that the invention is not limited to those precise embodiments, and that various other changes and modifications may be affected therein by one skilled in the art without departing from the scope and spirit of the invention.

What is claimed is:

1. A method for use in a mobile user station for accessing a packet-based multiaccess communications system including network nodes, comprising the steps of:

searching a database for an address of a second mobile user station, the address being a combination of an identifier of the second mobile user station and an identifier of a network node with which the second mobile user station is currently associated; and transmitting a packet containing the address of the second mobile user station and an address of the mobile user station, the address of the mobile user station being a combination of an identifier of the mobile user station and an identifier of a network node with which the mobile user station is currently associated, wherein any network node in the communications system is not required to obtain additional address information to direct the packet to the second mobile user station.

2. The method of claim 1, further including the steps of:

searching another database for an address of a home location register associated with the second mobile user station when the mobile user station can not find the address of the second mobile user station; and transmitting a request message to the home location register of the second mobile user station for requesting the home location register to provide the address of the second station to the station.

3. The method of claim 1, further including the step of transmitting a request message to a network node with which the station is in direct communication for requesting the address of the second station or the address of the home location register of the second station when the station can not find the address of the home location register of the second station, such that the direct network node can transmit the address of the second station or the home location register back to the station or transfer the request on to the home location register if the address of the second station is not known.

4. The method of claim 3, further including the step of the station receiving the address of the second station from the direct network node or the home location register of the second station such that the station can transmit a packet to the second station including the received address.

5. The method of claim 3, further including the step of extracting the address of the second station from a packet received from the second station when the station can not find the address of the second mobile user station such that the station can transmit a packet to the second station including the extracted address.

6. Apparatus for accessing apacket-based multiaccess communications system including network node, comprising:

a mobile user station configured for searching a database for an address of a second mobile user station, the address being a combination of an identifier of the second mobile user station and an identifier of a network node with which the second mobile user station is currently associated, and for transmitting a packet containing the address of the second mobile user station and an address of the mobile user station, the address of the mobile user station being a combination of an identifier of the mobile user station and an identifier of a network node with which the mobile user station is currently associated, wherein any network node in the communications system is not required to obtain additional address information to direct the packet to the second mobile user station.

7. The apparatus of claim 6, wherein the station is further configured for searching another database for an address of a home location register associated with the second mobile user station when the mobile user station can not find the address of the second mobile user station, and for transmitting a request message to the home location register of the second mobile user station for requesting the home location register to provide the address of the second station to the station.

8. The apparatus of claim 7, wherein the station is further configured for transmitting a request message to a network node with which the station is in direct communication for requesting the address of the second station or the address of the home location register of the second station when the station can not find the address of the home location register of the second station, such that the direct network node can transmit the address of the second station or the home location register back to the station or transfer the request on to the home location register if the address of the second station is not known.

9. The apparatus of claim 8, wherein the station is further configured for receiving the address of the second station from the direct network node or the home location register of the second station such that the station can transmit a packet to the second station including the received address.

10. The apparatus of claim 8, wherein the station is further configured for extracting the address of the second station from a packet received from the second station when the station can not find the address of the second mobile user station such that the station can transmit a packet to the second station including the extracted address.

11. A method for use in a mobile user station for accessing a packet-based multiaccess communications system, comprising the steps of:

inserting a host name associated with a second mobile user station in a packet, wherein the mobile user station is not required to obtain an address associated with the second mobile user station; and transmitting the packet to a network node with which the station is in direct communication such that the direct network node can insert an address of the second station in place of the host name and then transfer the packet on to the second stations, and such that the address of the second mobile station can be sent to the mobile user station to replace the host name in a subsequent packet to be transmitted.

12. The method of claim 11, further including the step of receiving the address of the second station from the direct network node and replacing the host name with the address in a subsequent packet transmitted to the direct network node.

13. The method of claim 11, further including the step of receiving the address of the second station from a home location register associated with the second station upon a request sent by the direct network node, the direct network node redirecting the packet transmitted by the station to the home location register along with the request.

14. The method of claim 13, wherein packet redirecting is done via one of source routing and tunneling.

15. The method of claim 13, wherein the home location register replaces the host name of the second station with the address, transfers the packet to the second station, and informs the station of the address.

16. Apparatus for accessing a packet-based multiaccess communications system, comprising:

a mobile user station configured for inserting a host name associated with a second mobile user station in a packet, wherein the mobile user station is not required to obtain an address associated with the second mobile user station, and transmitting the packet to a network node with which the station is in direct communication such that the direct network node can insert an address of the second station in place of the host name and then transfer the packet on to the second station, and such that the address of the second mobile station can be sent to the mobile user station to replace the host name in a subsequent packet to be transmitted.

17. The apparatus of claim 16, wherein the station is further configured for receiving the address of the second station from the direct network node and replacing the host name with the address in a subsequent packet transmitted to the direct network node.

18. The apparatus of claim 16, wherein the station is further configured for receiving the address of the second station from a home location register associated with the second station upon a request sent by the direct network node, the direct network node redirecting the packet transmitted by the station to the home location register along with the request.

19. The apparatus of claim 18, wherein the home location register replaces the host name of the second station with the address, transfers the packet to the second station, and informs the station of the address.

\* \* \* \* \*